US009984223B2

(12) United States Patent
Kotch

(10) Patent No.: US 9,984,223 B2
(45) Date of Patent: May 29, 2018

(54) ENCRYPTED MOUSE SYSTEM

(71) Applicant: Michael Kotch, Tucson, AZ (US)

(72) Inventor: Michael Kotch, Tucson, AZ (US)

( * ) Notice: Subject to any disclaimer, the term of this patent is extended or adjusted under 35 U.S.C. 154(b) by 11 days.

(21) Appl. No.: 15/152,556

(22) Filed: May 12, 2016

(65) Prior Publication Data

US 2017/0329950 A1   Nov. 16, 2017

(51) Int. Cl.
| | | |
|---|---|---|
| *G06F 3/033* | (2013.01) | |
| *G06F 21/00* | (2013.01) | |
| *G06F 3/0354* | (2013.01) | |
| *G06F 21/32* | (2013.01) | |
| *G06F 21/34* | (2013.01) | |
| *G06K 9/00* | (2006.01) | |
| *G06F 21/35* | (2013.01) | |

(52) U.S. Cl.
CPC .......... *G06F 21/34* (2013.01); *G06F 3/03543* (2013.01); *G06F 21/32* (2013.01); *G06F 21/35* (2013.01); *G06K 9/00087* (2013.01); *G06F 2203/0336* (2013.01)

(58) Field of Classification Search
CPC ....... G06F 21/32; G06F 21/34; G06F 3/03543
See application file for complete search history.

(56) References Cited

U.S. PATENT DOCUMENTS

| | | | |
|---|---|---|---|
| 5,420,936 A | 5/1995 | Fitzpatrick et al. | |
| 5,838,306 A * | 11/1998 | O'Connor | G06F 3/03543 345/156 |
| 6,148,094 A | 11/2000 | Kinsella | |
| 6,337,919 B1 | 1/2002 | Dunton | |
| D508,247 S | 8/2005 | Fisher et al. | |
| 7,003,142 B1 | 2/2006 | Kruse | |
| 7,330,571 B2 | 2/2008 | Svenson | |
| 7,664,961 B2 * | 2/2010 | Blattner | G06F 3/03543 713/182 |
| 8,643,511 B1 | 2/2014 | Batterson | |
| 2007/0057763 A1 * | 3/2007 | Blattner | G06F 3/03543 340/5.52 |
| 2015/0016665 A1 | 1/2015 | Tanner | |
| 2015/0067827 A1 * | 3/2015 | Lim | G06F 21/32 726/19 |

FOREIGN PATENT DOCUMENTS

WO    WO0233648    4/2002

\* cited by examiner

*Primary Examiner* — Xuemei Zheng

(57) ABSTRACT

An encrypted mouse system includes an electronic device that may contain passwords for an authorized user and an authorization code of the authorized user. A mouse is provided and the mouse may be manipulated. The mouse is in electrical communication with the electronic device. A scanning unit is coupled to the mouse and the scanning unit may read a thumbprint when the mouse is manipulated. The scanning unit is in electrical communication with the mouse. Thus, the mouse communicates the thumbprint to the electronic device thereby facilitating the thumbprint to be compared to the authorization code stored in the electronic device. The electronic device communicates the passwords to an extrinsic program. Thus, the electronic device logs the authorized user into the extrinsic program when the thumbprint scanned by the scanning unit matches the authorization code.

1 Claim, 3 Drawing Sheets

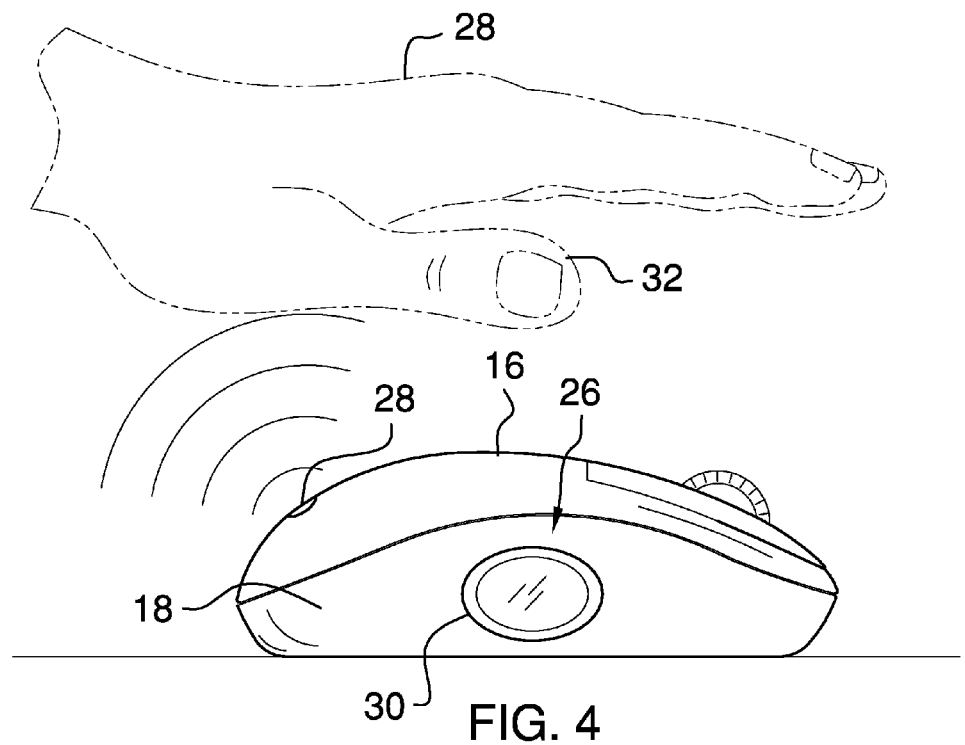
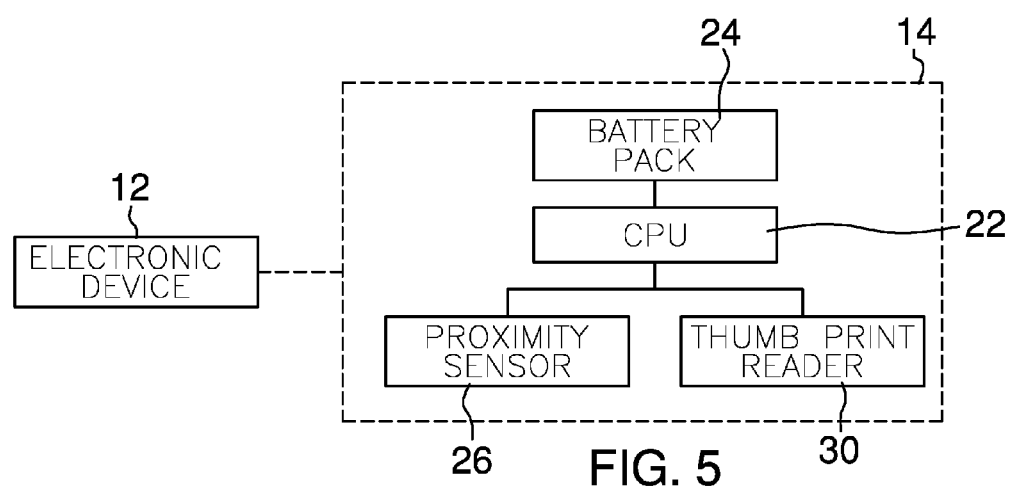

ENCRYPTED MOUSE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to mouse devices and more particularly pertains to a new mouse device for scanning a thumbprint and automatically logging a user into a password protected computer program.

BRIEF SUMMARY OF THE INVENTION

An embodiment of the disclosure meets the needs presented above by generally comprising an electronic device that may contain passwords for an authorized user and an authorization code of the authorized user. A mouse is provided and the mouse may be manipulated. The mouse is in electrical communication with the electronic device. A scanning unit is coupled to the mouse and the scanning unit may read a thumbprint when the mouse is manipulated. The scanning unit is in electrical communication with the mouse. Thus, the mouse communicates the thumbprint to the electronic device thereby facilitating the thumbprint to be compared to the authorization code stored in the electronic device. The electronic device communicates the passwords to an extrinsic program. Thus, the electronic device logs the authorized user into the extrinsic program when the thumbprint scanned by the scanning unit matches the authorization code.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a perspective in-use view of an embodiment of the disclosure.

FIG. 5 is a schematic view of an embodiment of the disclosure.

DETAILED DESCRIPTION OF THE INVENTION

Figure 1:
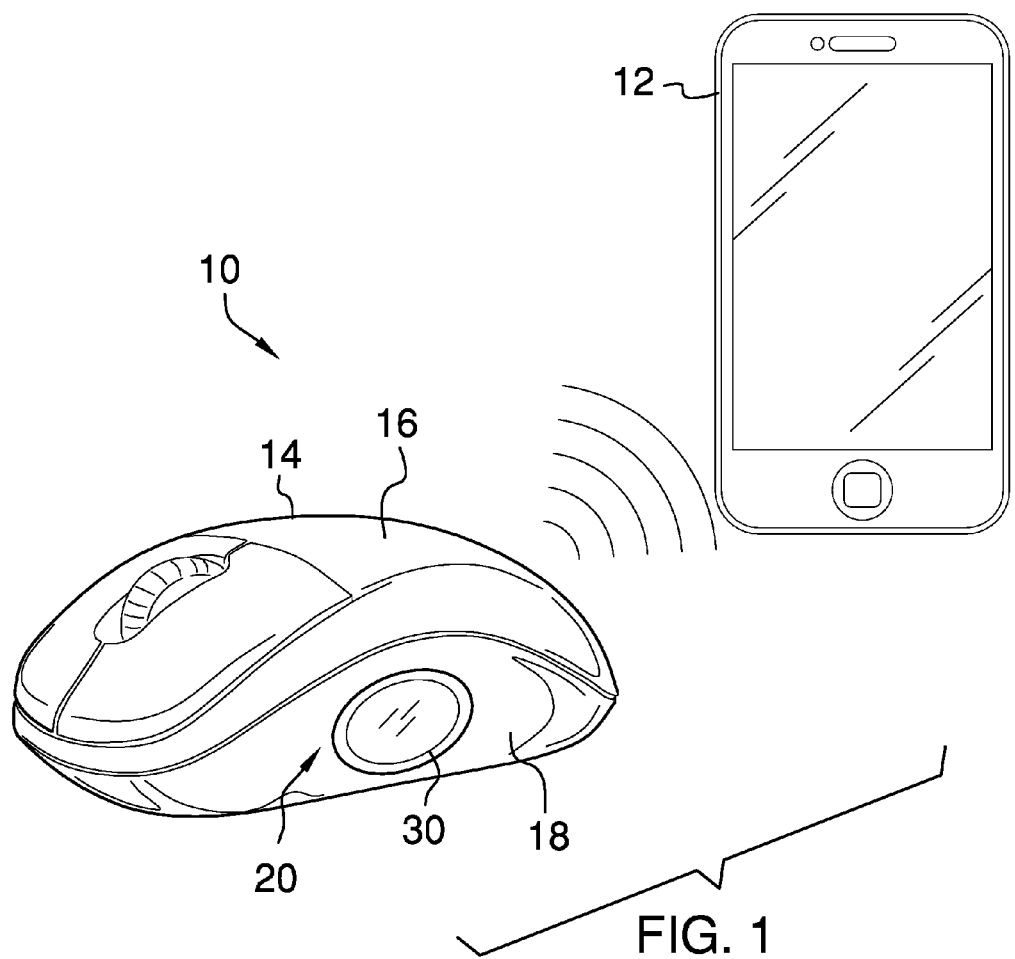
FIG. 1 is a perspective view of an encrypted mouse system according to an embodiment of the disclosure.
Figure 2:
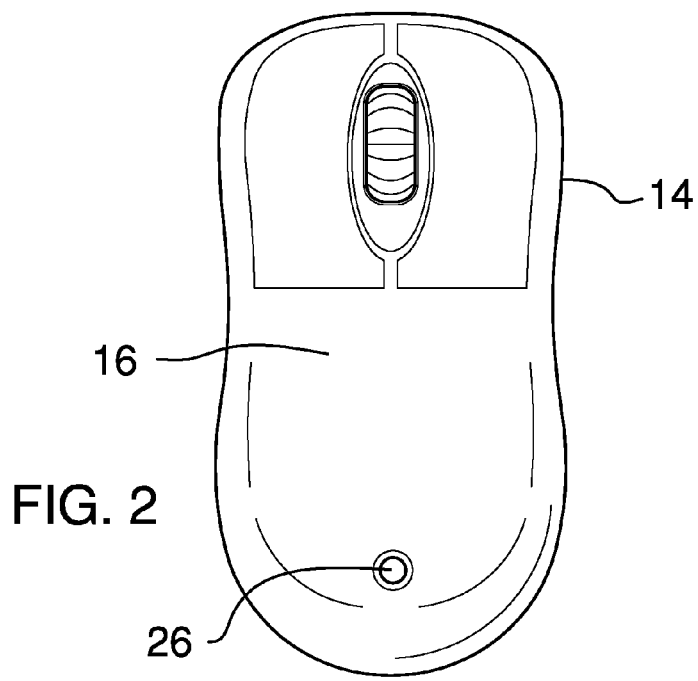
FIG. 2 is a top view of an embodiment of the disclosure.
Figure 3:
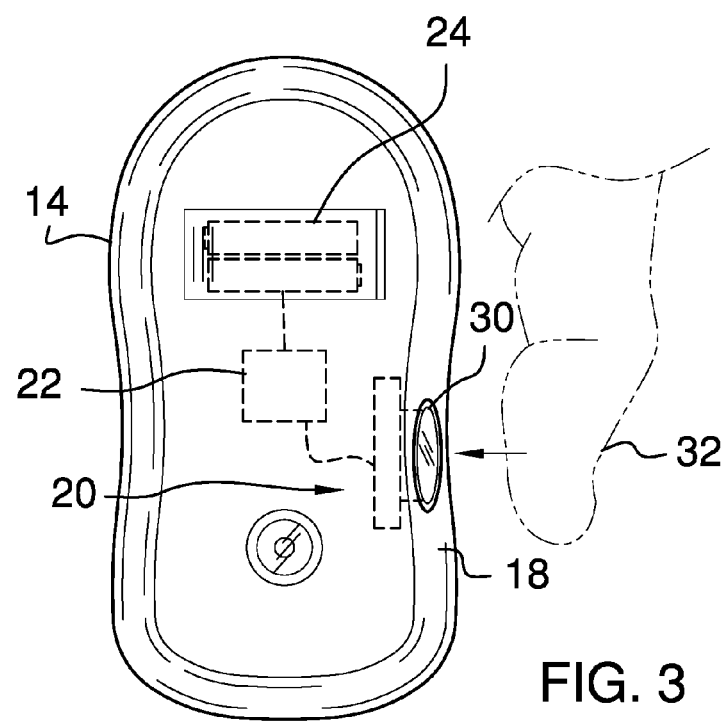
FIG. 3 is a bottom phantom view of an embodiment of the disclosure.

With reference now to the drawings, and in particular to FIGS. 1 through 5 thereof, a new mouse device embodying the principles and concepts of an embodiment of the disclosure and generally designated by the reference numeral 10 will be described.

As best illustrated in FIGS. 1 through 5, the encrypted mouse system 10 generally comprises an electronic device 12 that may contain passwords for an authorized user and an authorization code of the authorized user. The authorization code may comprise a pre-determined thumbprint. The electronic device 12 may comprise a personal computer or the like. A mouse 14 is provided. The mouse 14 may be manipulated and the mouse 14 is in electrical communication with the electronic device 12. The mouse 14 has a top wall 16 and a lateral wall 18. The mouse 14 may comprise a wireless mouse or the like.

A scanning unit 20 is coupled to the mouse 14 and the scanning unit 20 may read a thumbprint when the mouse 14 is manipulated. The scanning unit 20 is in electrical communication with the mouse 14. The mouse 14 communicates the thumbprint to the electronic device when the scanning unit 20 reads the thumbprint. Thus, the thumbprint may be compared to the authorization code stored in the electronic device 12. The electronic device 12 may communicate the passwords to an extrinsic program. Thus, the electronic device 12 may log the authorized user into the extrinsic program when the thumbprint scanned by the scanning unit 20 matches the authorization code. The extrinsic program may comprise a computer program employing password protection or the like.

The scanning unit 20 comprises a processor 22 that is coupled to the mouse 14. The processor 22 is electrically coupled to the mouse 14. The processor 22 may comprise an electronic processor or the like. The mouse 14 includes a power supply 24 and the processor 22 is electrically coupled to the power supply 24.

A proximity sensor 26 is coupled to the top wall 16 of the mouse 14. Thus, the proximity sensor 26 may sense when a hand 28 is placed on the mouse 14. The proximity sensor 26 is electrically coupled to the processor 22. The processor 22 generates a scanning sequence when the proximity sensor 26 senses the hand 28 is placed on the mouse 14. The proximity sensor 26 may comprise an electronic proximity sensor or the like.

A thumbprint reader 30 is coupled to the lateral wall 18 of the mouse 14. Thus, the thumbprint reader 30 is positioned to engage a thumb 32 when the mouse 14 is manipulated. The thumbprint reader 30 is electrically coupled to the processor 22. The thumbprint reader 30 scans a thumbprint when the processor 22 generates the scanning sequence. Thus, the mouse 14 may communicate the thumbprint to the electronic device 12. The thumbprint reader 30 may comprise an electronic thumbprint reader or the like.

In use, the mouse 14 is manipulated in the convention of mouse usage. The proximity sensor 26 senses when the hand 28 is placed on the mouse 14. Thus, the processor 22 generates the scanning sequence. A thumb 32 is placed on the thumbprint reader 30 and the thumbprint reader 30 scans the thumbprint of the thumb 32.

The mouse 14 communicates the thumbprint to the electronic device 12. The electronic device 12 compares the thumbprint to the authorization code. Moreover, the electronic device 12 communicates the passwords to the extrinsic program when thumbprint matches the authorization code. Thus, a user is not required to manually enter passwords into the extrinsic program. The processor 22 generates the scanning sequence each time the proximity sensor 26 senses the hand 28 is placed on the mouse 14. Thus, an unauthorized user is inhibited from logging in to the extrinsic program.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An encrypted mouse system comprising:

an electronic device being configured to contain passwords for an authorized user and an authorization code of the authorized user;

a mouse being configured to be manipulated, said mouse being in electrical communication with said electronic device, said mouse having a top wall and a lateral wall; and a scanning unit being coupled to said mouse wherein said scanning unit is configured to read a thumbprint when said mouse is manipulated, said scanning unit being in electrical communication with said mouse such that said mouse communicates the thumbprint to said electronic device thereby facilitating the thumbprint to be compared to the authorization code stored in said electronic device, wherein said electronic device is configured to communicate the passwords to an extrinsic program thereby facilitating said electronic device to log the authorized user into the extrinsic program when the thumbprint scanned by said scanning unit matches the authorization code, said scanning unit comprising:

a processor being coupled to said mouse, said processor being electrically coupled to said mouse, a proximity sensor being coupled to said top wall of said mouse wherein said proximity sensor is configured to sense when a hand is placed on said mouse, said proximity sensor being electrically coupled to said processor, said processor generating a scanning sequence when said proximity sensor senses the hand is placed on said mouse, and a thumbprint reader being coupled to said lateral wall of said mouse wherein said thumbprint reader is configured to be manipulated, said thumbprint reader being electrically coupled to said processor, said thumbprint reader scanning a thumbprint when said processor generates said scanning sequence thereby facilitating said mouse to communicate the thumbprint to said electronic device.

* * * * *